Patented Mar. 29, 1927.

1,622,684

UNITED STATES PATENT OFFICE.

ALBERT G. STILLWELL, OF COSCOB, CONNECTICUT.

PROCESS OF PRODUCING FERTILIZER.

No Drawing. Application filed October 21, 1924. Serial No. 745,013.

In the preparation of fish, meat and other similar materials and in the maceration of such materials, considerable waste water is produced, and known to possess considerable fertilizer material, but hitherto has been, in large part, wasted.

In order to use satisfactorily the constituents of the waste liquid as fertilizer material, the requirements are that the material produced shall be mechanically in such form that it will readily pass through fertilizing machines of conventional types. In order to fulfill this requirement it is necessary that the material be free of lumps and globules of excessive size.

This is particularly important in the case of matter containing glue or sticky substances such as the waste liquid from fish and meat, as the presence of such substance prevents the production of a homogeneous product, and prior known methods of producing fertilizer material from such waste liquid have therefore been inoperative and ineffective.

Broadly stated, it is the object of the present invention to utilize the fertilizer values of the waste water from prior operations on fish and meat material.

A feature of the invention is the utilization of waste water from materials containing glue or sticky substances and producing therefrom a material in such form as to be adapted for use as a fertilizer base or fertilizer.

Another feature relates to an improved process of producing fertilizer material in which only mechanical action and mixing is required. Thus no time need be spent, nor provisions made for chemical action or reaction, and the process is thereby performed more expeditiously and economically.

The preferred method or process herein described has been found in practice to be particularly useful and effective in treating the waste water from fish refuse in canning operations, and particularly "menhaden" fish, but it is equally applicable to the treatment of waste liquid from operations of whatever nature in which a valuable fertilizer constituent is found.

By subjecting the waste liquid produced in such operations to my improved treatment, much valuable fertilizer material can be recovered at low cost.

The fertilizer material produced by the improved process may be used for any desired purpose, as for example, as a so-called fertilizer base to form the principal constituent of a variety of desired fertilizer compounds, each made up in accordance with a specific formula, or it may be used in itself as a fertilizer.

By "waste water" is meant, in the present description and the claims, the so called waste of prior operations and which has hitherto been wasted; it being understood that by the use of my improved process such fluid is reclaimed, at least in part. It will be understood, that the so-called waste forms the "raw material" or material to be treated, of this improved process, and accordingly the term "waste water" as herein used is intended to designate the particular fluid known by that term in the art to which the invention relates, and is not intended to designate any characteristic of, nor to indicate any purpose for, the water.

In the treatment of waste water, or the material to be acted upon, the fluid is, if necessary, first separated from any oil which may be present. This may be done by skimming, or any equivalent manner.

The residue, after the oil has been taken off, is evaporated, if necessary, to a thick paste having a consistency approximately that of molasses.

I have found that this water should be evaporated to a specific gravity of from 28° to 42° Baumé.

The concentrate is then mixed with acid phosphate of commerce and I have found that any good grade of commercial acid phosphate or of superphosphate is effective for the purpose. Commercial grades of acid phosphate or superphosphate are conventionally supplied in powder form, although containing some moisture. The acid phosphate of commerce is the calcium acid phosphate.

If the concentrate has been reduced to a specific gravity of from 28° to 32° Baumé, three parts of the concentrate is mixed with two parts of acid phosphate or superphosphate. If the concentrate is reduced to a specific gravity of about 42° Baumé equal parts of concentrate and acid phosphate or superphosphate are mixed.

The concentrate, which it will be understood is in liquid form, and the acid phosphate (in powder form) are thoroughly mixed, as by stirring or otherwise being agitated, to maintain the particles of acid phosphate in suspension in the liquid.

The agitation is continued until the next step of the process has been completed.

The mixture is now dehydrated by being subjected to a temperature above 100° C., and preferably to a temperature of from 110° to 140° C., until the resultant product is dry and in a friable form.

This product constitutes the fertilizer material and is ready for sale as a complete fertilizer, testing approximately 6% ammonia, 11% available phosphoric acid and 2.5% potash, or as a base for other fertilizer compounds.

The product is substantially dry and will stay dry and it is free of undesirable stickiness. It does not tend to form balls or masses of sticky material which would clog the passages of fertilizing machines. It can be spread out readily and when aggregated with other material can be readily mixed.

Having thus described my invention, I claim:

1. The method of producing a fertilizer material, which consists in mixing waste water containing a fertilizer constituent with calcium acid phosphate to form a mechanical mixture, and dehydrating the mixture.

2. The method of producing a fertilizer material which consists in mixing, with waste fluid containing a fertilizer constituent, a mass of calcium acid phosphate in powdered form, maintaining said constituent and the particles of acid phosphate in suspension in the fluid, and dehydrating the mixture.

3. The method of producing a fertilizer material which consists in evaporating waste water containing a fertilizer constituent to the consistency of molasses, adding calcium acid phosphate thereto, agitating the mixture to maintain the acid phosphate in suspension therein, and dehydrating the mixture to form a powder.

4. The method of producing a fertilizer material which consists in evaporating waste water containing a fertilizer constituent to a thick paste, mixing approximately three parts of said paste to approximately two parts of calcium acid phosphate, and dehydrating the mixture.

5. The method of producing a fertilizer material which consists in reducing waste water containing food products to 28° to 32° Baumé, mixing substantially three parts thereof to substantially two parts of calcium acid phosphate agitating the mixture to maintain the particles of material in suspension, and subjecting the mixture to a temperature of from 110° C. to 140° C. until the resultant is dry.

6. As an article of manufacture, a fertilizer material formed of a dehydrated mixture of liquid containing waste food matter and calcium acid phosphate.

7. As an article of manufacture, a fertilizer material formed of a dehydrated mixture of liquid containing waste food matter and calcium acid phosphate in the proportion of five parts of liquid and three of acid phosphate.

8. The method of treating fluid material having a valuable fertilizing content to produce a usable fertilizer material therefrom, which consists in introducing into the fluid particles of calcium acid phosphate, agitating the material to circulate the particles and then dehydrating the mixture.

9. The method of treating fluid material having a valuable fertilizing content to produce a usable fertilizer material therefrom, which consists in introducing into the fluid particles of calcium acid phosphate, agitating the material sufficiently to maintain the particles in suspension and then dehydrating the mixture.

In testimony whereof I have hereunto set my hand.

ALBERT G. STILLWELL.